United States Patent
Dutta et al.

(10) Patent No.: US 11,601,212 B2
(45) Date of Patent: Mar. 7, 2023

(54) CDMA-IA NETWORK CONCEPT OF OPERATIONS AND MEDIA ACCESS CONTROL (MAC) LAYER

(71) Applicant: ATC Technologies LLC, Reston, VA (US)

(72) Inventors: Santanu Dutta, Vienna, VA (US); Gary Churan, Annandale, VA (US); Dunmin Zheng, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 59 days.

(21) Appl. No.: 17/180,079

(22) Filed: Feb. 19, 2021

(65) Prior Publication Data

US 2021/0266087 A1    Aug. 26, 2021

Related U.S. Application Data

(60) Provisional application No. 62/979,141, filed on Feb. 20, 2020.

(51) Int. Cl.
*H04B 7/216* (2006.01)
*H04J 11/00* (2006.01)
(Continued)

(52) U.S. Cl.
CPC ........ *H04J 11/0023* (2013.01); *H04L 5/0048* (2013.01); *H04W 16/14* (2013.01); *H04J 2011/0006* (2013.01); *H04W 84/18* (2013.01)

(58) Field of Classification Search
CPC .......... H04B 1/707; H04B 2201/70701; H04B 7/2628; H04B 1/7097;
(Continued)

(56) References Cited

U.S. PATENT DOCUMENTS

| 7,940,778 B2 * | 5/2011 | Ding | H04W 40/28 370/235 |
| 2010/0061496 A1 * | 3/2010 | Black | H04W 52/36 375/346 |

(Continued)

FOREIGN PATENT DOCUMENTS

| CN | 106604414 A | * | 4/2017 | ............ H04W 84/18 |
| CN | 106304229 B | * | 8/2019 | ............ H04B 1/0003 |
| CN | 110167032 A | * | 8/2019 | ............ H04W 84/18 |

OTHER PUBLICATIONS

Churan, et al., "Dynamic spectrum sharing with other networks using optimized PHY/MAC layers", Wireless Innovation Forum, Oct. 29, 2019, retrieved on [May 21, 2021]. Retrieved from the Internet <URL:https://www.wirelessinnovation.org/assets/Proceedings/2019/TS1.2%20Dutta%20Presentation.pdf> document.

(Continued)

*Primary Examiner* — Phuongchau Ba Nguyen
(74) *Attorney, Agent, or Firm* — Michael Best & Friedrich LLP

(57) ABSTRACT

The present disclosure describes the concept of operations and the medium access control protocols of a wireless communication system using code-division multiple access with interference avoidance (CDMA-IA) as its physical layer. The system can dynamically share a common band with other networks without a central radio resource controller. In one embodiment, the wireless communication system includes a plurality of radio nodes forming a wireless mesh network, wherein the pairs of radio nodes use, individually optimized, time division duplexing. At least one radio node includes a software-defined radio, a memory, and an electronic processor. The electronic processor is configured to control the software-defined radio to transmit a pilot signal and share various state information with the other nodes of the network. The shared information includes local (Continued)

spectrum occupancy and node connectivity sets. The pervasive sharing of spectrum occupancy among all nodes enables the usage of the shared band to be maximized.

19 Claims, 7 Drawing Sheets

(51) Int. Cl.
*H04L 5/00* (2006.01)
*H04W 16/14* (2009.01)
*H04W 84/18* (2009.01)

(58) Field of Classification Search
CPC .......... H04B 2201/709709; H04J 13/00; H04J 13/16; H04J 11/0023; H04J 2011/0006; H04L 5/0048; H04W 16/14; H04W 84/18
See application file for complete search history.

(56) References Cited

U.S. PATENT DOCUMENTS

| | | | |
|---|---|---|---|
| 2010/0233963 A1* | 9/2010 | Harada | H04W 16/14 455/67.11 |
| 2012/0257553 A1* | 10/2012 | Noh | H04L 5/0073 370/280 |
| 2012/0264388 A1* | 10/2012 | Guo | H04B 17/345 455/307 |
| 2013/0288613 A1* | 10/2013 | Nicollet | H04B 1/525 455/73 |
| 2015/0281907 A1 | 10/2015 | Huber et al. | |
| 2016/0029403 A1 | 1/2016 | Roy et al. | |
| 2019/0007919 A1 | 1/2019 | Petrus et al. | |
| 2019/0165827 A1* | 5/2019 | Churan | H04L 27/0006 |

OTHER PUBLICATIONS

PCT/US2021/018772 International Search Report and Written Opinion dated Jun. 3, 2021.

* cited by examiner

| | Receive UE | | | | | |
|---|---|---|---|---|---|---|
| Transmit UE | 1 | 2 | 3 | ••• | K-1 | K |
| 1 | X | $Q_{1,2}$ | $Q_{1,3}$ | ••• | $Q_{1,K-1}$ | $Q_{1,K}$ |
| 2 | $Q_{2,1}$ | X | $Q_{2,3}$ | ••• | $Q_{2,K-1}$ | $Q_{2,K}$ |
| 3 | $Q_{3,1}$ | $Q_{3,2}$ | X | ••• | $Q_{3,K-1}$ | $Q_{3,K}$ |
| ⋮ | ⋮ | ⋮ | ⋮ | ⋮ | ⋮ | ⋮ |
| K-1 | $Q_{K-1,1}$ | $Q_{K-1,2}$ | $Q_{K-1,3}$ | ••• | X | $Q_{K-1,K}$ |
| K | $Q_{K,1}$ | $Q_{K,2}$ | $Q_{K,3}$ | ••• | $Q_{K,K-1}$ | X |

CDMA-IA NETWORK CONCEPT OF OPERATIONS AND MEDIA ACCESS CONTROL (MAC) LAYER

CROSS-REFERENCE TO RELATED APPLICATION

This application claims the benefit of U.S. Provisional Application No. 62/979,141, filed on Feb. 20, 2020, the entire content of which is hereby incorporated by reference.

FIELD OF INVENTION

The present disclosure relates generally to wireless communication systems. More specifically, the present disclosure relates to a wireless communication system with code-division multiple access and interference avoidance ("CDMA-IA communication system").

BACKGROUND

Conventional CDMA methods both accept some interference from other users and causes some interference to others, albeit relatively small depending on the processing gain. In some applications, the above reduction of mutual interference by conventional spread spectrum processing may be insufficient to meet SNIR requirements.

SUMMARY

The concept of CDMA with Interference Avoidance (CDMA-IA) was introduced as a new, 'water filling', physical layer technique, suitable for mesh networks. For reference, the CDMA-IA physical layer is defined by Churan, G., "Wireless Communication Systems with Code-Division Multiple Access and Interference Avoidance," U.S. Pat. No. 10,666,316 and Gary Churan, Santanu Dutta and Dunmin Zheng, "Dynamic spectrum sharing with other networks using optimized PHY/MAC layers", WInnforum Summit, San Diego, Oct. 23, 2019. <https://www.wirelessinnovation.org/assets/Proceedings/2019/TS1.2%20Dutta%20Presentation.pdf>, the entire contents of which are hereby incorporated by reference.

CDMA-IA automatically adjusts its spectrum occupancy to fit into the holes of the ambient spectra of other networks, as observed at a receiving terminal, providing certain advantages over traditional CDMA. Chief among these is the minimization of interference caused to and from the other networks.

Several practical applications exist for this concept of CDMA-IA, including the emergent Citizens Band Radio System (CBRS) at 3.5 GHz and traditional High Frequency communications. In CBRS, General Authorized Access (GAA) device types are well suited to use CDMA-IA as they have the lowest status in the CBRS spectrum sharing hierarchy—they must not cause interference to higher priority receivers and operate with leftover spectrum unused by higher priority systems. While there is expected to be an adequate supply of such spectrum, the spectrum distribution is expected to be dynamic to accommodate the changing needs of the highest priority military users. This requires the lower communication-protocol layers of GAA systems to be equally dynamic in utilizing the available spectrum.

The present disclosure, and in particular, the embodiments set forth below build on the CDMA-IA physical layer described above and describe a new Medium Access Control (MAC) layer. Additionally, new concepts of operation (CONOPS) are described herein, which are suitable for ad hoc mesh networks that can adapt to changing traffic patterns and environmental conditions.

In one embodiment, the disclosure includes a wireless communication system including a plurality of radio nodes forming a wireless mesh network and pairs of the plurality of radio nodes are configured to communicate with each other. At least one radio node of the plurality of radio nodes includes a software-defined radio, a memory, and an electronic processor communicatively connected to the memory. The electronic processor is configured to control the software-defined radio to transmit a pilot signal and a first state information of the at least one radio node to other radio nodes of the plurality of radio nodes that are part of the wireless mesh network, control the software-defined radio to gather pilot signals and a second state information from the other radio nodes that are part of the wireless mesh network, control the software-defined radio to transmit an access request to one of the other radio nodes, and control the software-defined radio to start exchange of traffic data with one of the other radio nodes in response to receiving an access grant by the one of the other radio nodes.

In another embodiment, the disclosure includes a wireless communication method. The method includes controlling, with an electronic processor, a software-defined radio to transmit a pilot signal and first state information of at least one radio node of a plurality of radio nodes to other radio nodes of the plurality of radio nodes that are part of a wireless mesh network. The method includes controlling, with the electronic processor, the software-defined radio to gather pilot signals and second state information from the other radio nodes of the plurality of radio nodes that are part of the wireless mesh network. The method includes controlling, with the electronic processor, the software-defined radio to transmit an access request to one of the other radio nodes. The method also includes controlling, with the electronic processor, the software-defined radio to start exchange of traffic data with the one of the other radio nodes in response to receiving an access grant by the one of the other radio nodes.

In yet another embodiment, the disclosure includes a non-transitory computer-readable medium comprising instructions that, when executed by a server, cause the server to perform a set of operations. The set of operations includes controlling a software-defined radio to transmit a pilot signal and first state information of at least one radio node of a plurality of radio nodes to other radio nodes of the plurality of radio nodes that are part of a wireless mesh network. The set of operations includes controlling the software-defined radio to gather pilot signals and second state information from the other radio nodes of the plurality of radio nodes that are part of the wireless mesh network. The set of operations includes controlling the software-defined radio to transmit an access request to one of the other radio nodes. The set of operations also includes controlling the software-defined radio to start exchange of traffic data with the one of the other radio nodes in response to receiving an access grant by the one of the other radio nodes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EXEMPLARY EMBODIMENTS

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced, or carried out, in various ways.

Figure 1:
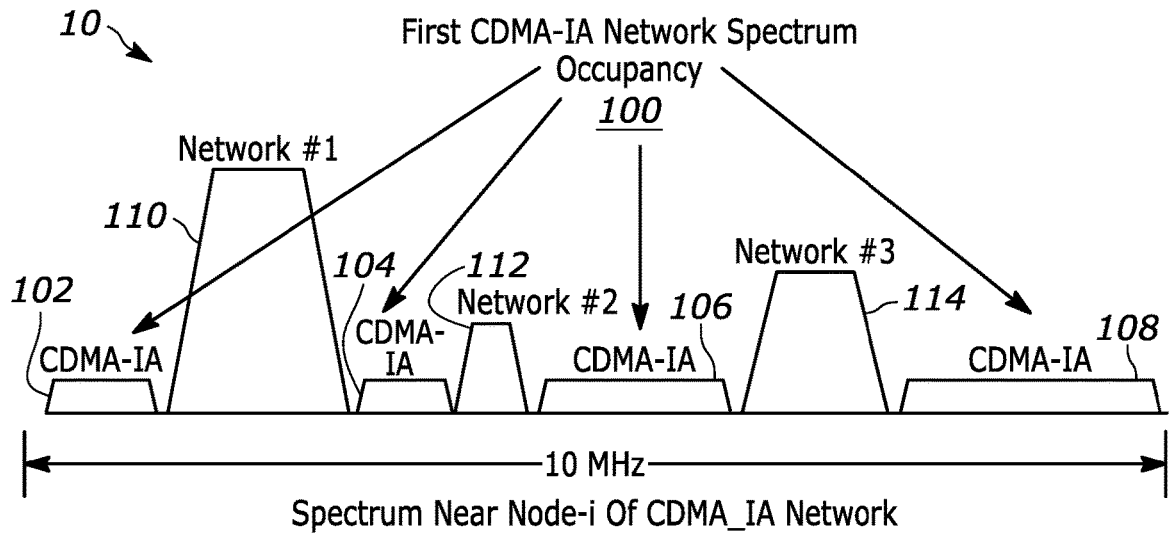
FIGS. 1 and 2 are diagrams illustrating a CDMA-IA network adapting from a first CDMA-IA network spectrum occupancy observed at a first geographic location to a second CDMA-IA network spectrum occupancy observed at a second and different geographic location, in accordance with various aspect of the disclosure.
Figure 2:
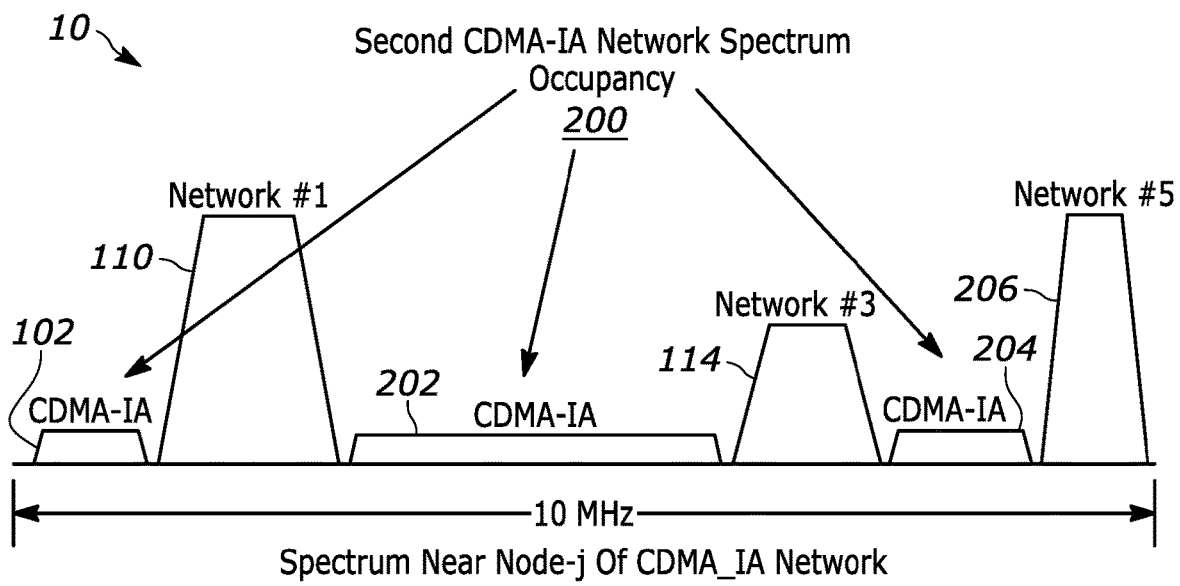

FIGS. 1 and 2 are diagrams illustrating a CDMA-IA network 10 adapting from a first CDMA-IA network spectrum occupancy 100 observed at a first geographic location (e.g., node-i) to a second CDMA-IA network spectrum occupancy 200 observed at a second and different geographic location (e.g., node-j), in accordance with various aspect of the disclosure. In both cases, a common 10 MHz wide band is being shared between a CDMA-IA network and a plurality of networks, such as Network #1, Network #2 and Network #3.

In the example of FIG. 1, the first CDMA-IA network spectrum occupancy 100, observed at a first receiver location of node-i, has four, occupied CDMA-IA spectrum sub-bands 102-108, and three, other-network (referred to as Network) occupied, sub-bands 110-114. As per the design of the CDMA-IA physical layer described above, the CDMA-IA network automatically senses the spectral gaps, or holes, in the spectrum of received signals at every CDMA-IA receiver. All CDMA-IA transmit signals, except broadcast signals, constrain their spectrum occupancies to fit into the holes of the other-network interference spectra at the location of the destination CDMA-IA receiver.

FIG. 2 shows an example other-network interference spectrum, at the second receiver location of node-j. As shown in the diagram, CDMA-IA signals targeting the second receiver location, specifically sub-bands 102, 202 and 204, adjust their spectrum occupancies to fit into the holes left by the spectra of Network #1 110, Network #3 114 and Network #5 206.

Figure 3:
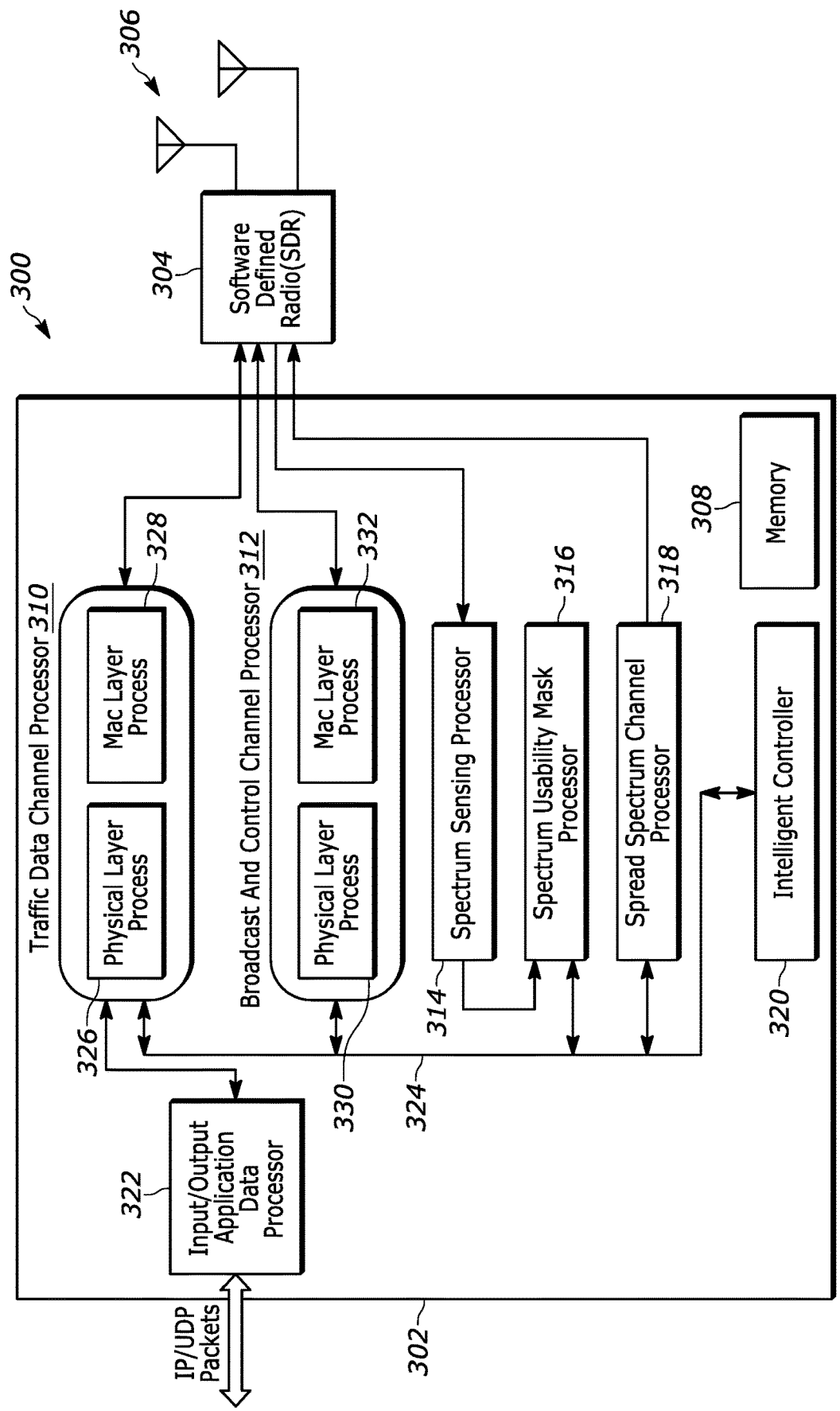
FIG. 3 is a block diagram illustrating an example of a radio node architecture, in accordance with various aspects of the disclosure.

FIG. 3 is a block diagram illustrating an example of a radio node architecture 300, in accordance with various aspects of the disclosure. Other architectures can also deliver the same functionality and are equally covered by the functionality described herein. In the example of FIG. 3, the radio node architecture 300 includes a server 302, which is communicatively and bi-directionally coupled to a software defined radio (SDR) 304, connected to an array of transmit/receive antennas 306. As illustrated in FIG. 3, the server 302 includes a memory 308, a traffic data channel processor 310, a broadcast and control channel processor 312, a spectrum sensing processor 314, a Spectrum Usability Mask processor 316, a spread spectrum pilot channel processor 318, an intelligent controller 320, an input/output application data processor 322, and a communication bus 324.

The SDR 304 performs frequency translation between the complex baseband form of the signal at the server interface and the analog form of the signal at RF, which exists at the antenna interface. The complex baseband (digital I and Q) signals are generated by the server 302, which may comprise a combination of digital signal processors (DSPs), general purpose processing units (GPUs) and application specific integrated circuits (ASIC), together with program and data memory resources 308. Typically, data memory, used for the storage of temporary data, is transitory and program memory, used to store instructions executed by the server 302, is non-transitory. The focus of the present description is on the functional architecture of the server 302. The "processors" that make up the overall functionality of server 302 are implemented in software using the hardware resources (processor and memory) available on the server 302. Stated differently, "processor" is a functional element which executes the indicated process. The process may be implemented utilizing a combination of hardware and software enabling means, including wholly in software on a general purpose electronic processor, or server, without departing from the teachings or the scope of the present disclosure. The functional architecture is described below.

An input/output application data processor 322 performs formatting functions on the input and output data, which is typically presented at the interface as IP or UDP packets. A traffic data channel processor 310 executes the physical and media-access control (MAC) layer processes of the chosen communication protocol stack for both transmit and receive; the physical layer and MAC layer processes are shown as processes 326 and 328, respectively. A broadcast and control channel processor 312 generates and receives broadcast and control channel data. Like the traffic data channel processor 310, the broadcast and control channel processor 312 also includes a physical layer process 330 and a MAC layer process 332. A spread spectrum pilot channel processor 318 generates the pilot channel used for time and frequency synchronization of the transmitted signal at the destination receiver; a spectrum sensing processor 314 estimates the spectrum occupancy of the wireless wideband channel. A Spectrum Usability Mask processor 316 generates a usability mask from the spectrum occupancy sensed by the spectrum sensing processor 314.

In some embodiments, the radio node architecture 300 may include fewer or additional components in configurations different from that illustrated in FIG. 3. Also, the radio node architecture 300 may perform additional functionality to the functionality described herein.

The present disclosure is focused on the MAC layer and the Concept Of Operations (CONOPS) at a system level, for example, the MAC layer processes 328 and 332 as described above. One of the main attributes of any MAC layer is transmit/receive duplexing. In particular, adaptive Time Division Duplexing (TDD) is described herein because TDD maximizes spectrum efficiency in a dynamic environment. The CONOPS depends to a large extent on the choice of the network topology, the main choices being centralized hub-and-spoke (as in a traditional cellular network) and ad hoc mesh (e.g. Bluetooth, where there is no mandatory, central relay node, also known as a base station, for exchanging packets between nodes of the network). The decentralized nature of a mesh network allows networkwide spectrum efficiency to be maximized in dynamic spectrum sharing.

The intersection of the attributes of CDMA-IA's physical layer (i.e., physical layer processes 326 and 330) and those of TDD duplexing and mesh topology creates some unusual system design challenges. With CDMA as the multiple access technique, a terminal may simultaneously exchange packets with several terminals in parallel. Nevertheless, with TDD, a terminal cannot transmit and receive at the same time. Additionally, a common (i.e., time synchronized) uplink phase and a common downlink phase for all terminals in the network cannot be used because the network topology is a mesh topology, unlike in hub-and-spoke cellular networks where such common phases can be used.

The potential presence of hidden nodes in the network makes it possible to reuse TDD time slots for a given frequency without interference, and thereby maximize spectrum efficiency, like frequency reuse in a traditional cellular network. In the present context, 'hidden nodes' refers to nodes that cannot communicate directly. For example, if all terminals were within connection range of each other, a relatively simple TDD scheme, or TD_Map, may be used, where each terminal had a repeated, reserved, transmit opportunity. All other terminals would be in the receive mode during this time. However, this static scheme will not be very spectrally efficient in a dynamic environment where the following are likely to hold: 1) traffic load on the terminals is non-uniform and dynamic, 2) terminals need to transmit broadcast channels (including pilot signals and Spectrum Usability Masks), which require maximization of on-air time, and 3) not all terminals will be in connection range (some may be "hidden"), making it spectrally wasteful to allocate networkwide unique transmit epochs for every terminal.

The duplexing scheme chosen is adaptive TDD, wherein the transmit/receive duplexing-time-map (TD_Map) of each terminal is unique and is dependent on its operating environment and load. Communications between a given pair of terminals must be consistent with the TD_Map of both. In the present system, the TD_Map for each terminal is adaptively negotiated between terminals that are in communication range and need to communicate. Transmit epochs are reused between terminals that are not in connection range or do not need to communicate.

Frame Structure

Figure 4:
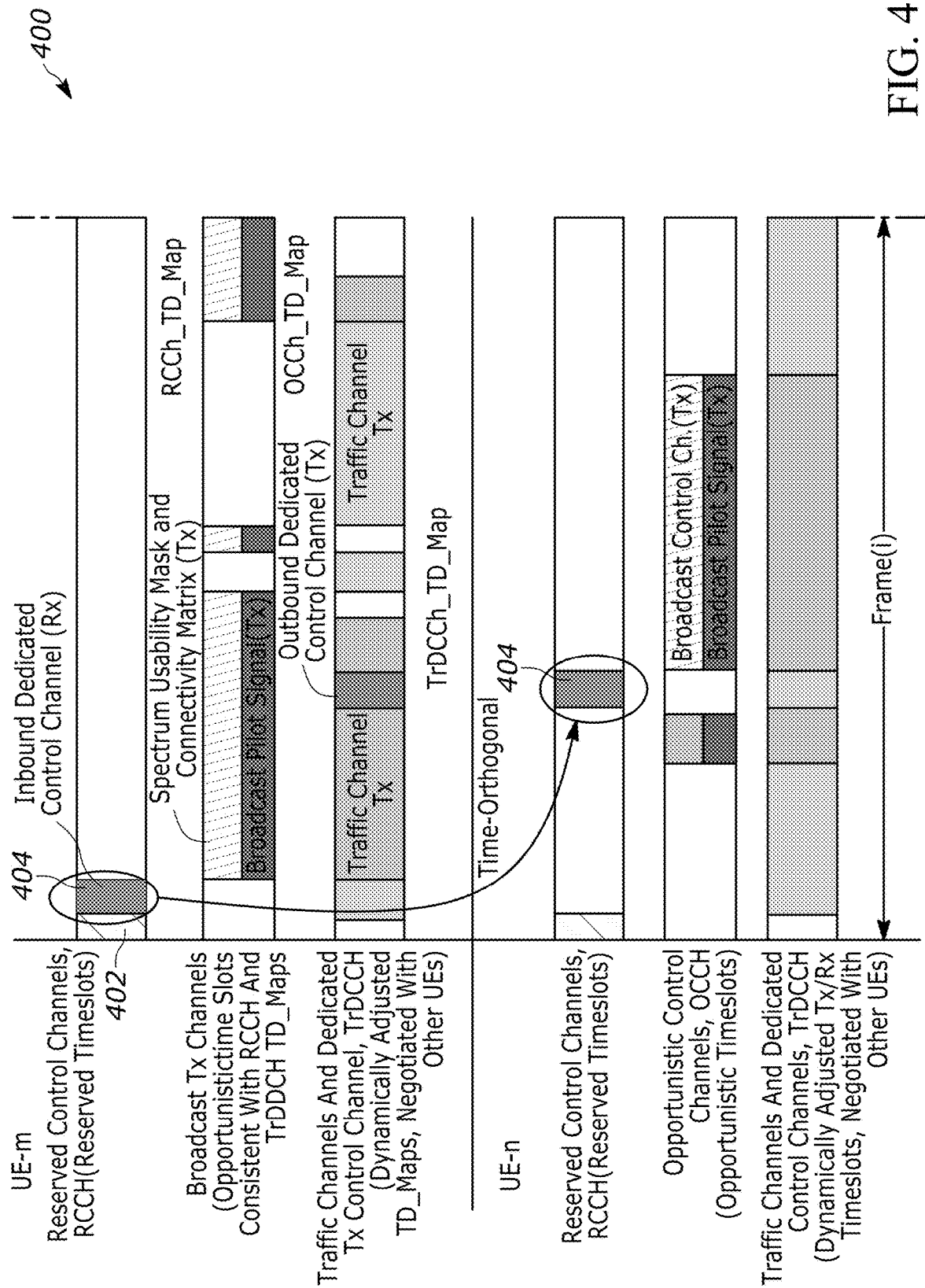
FIG. 4 is a diagram illustrating an example frame structure, in accordance with various aspects of the disclosure.
Figure 4:
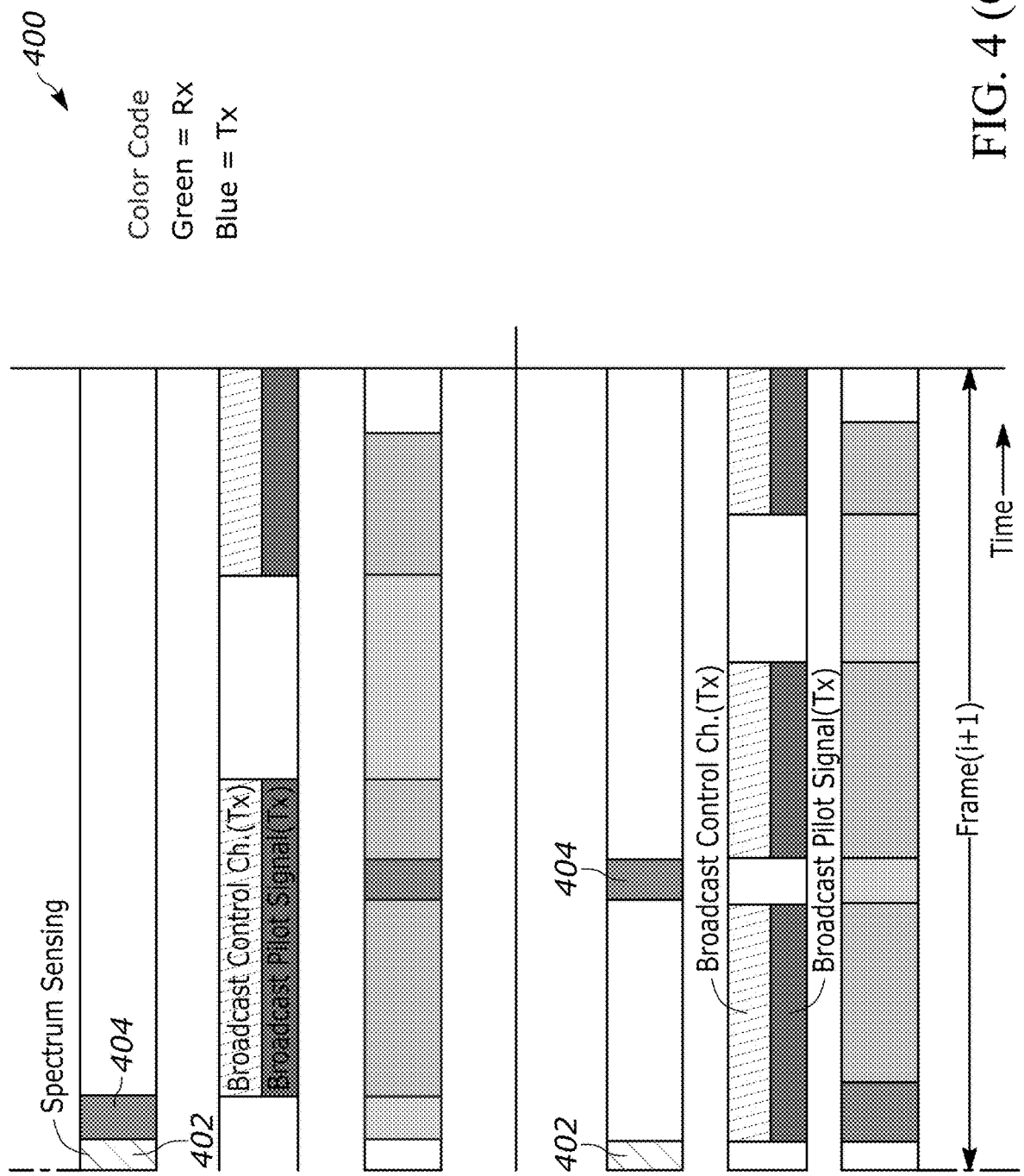

The time domain is divided into hierarchical frames of fixed durations, and a certain (e.g., N) number of frames may form a superframe. The frame timing is synchronized to GPS or other source of universal time. FIG. 4 is a diagram illustrating an example frame structure 400, in accordance with various aspects of the disclosure.

The frame numbering applies networkwide, where the term, "network," applies to a common geography. Between disjoint regions with little mutual radio propagation, all frames may be reused.

Each frame begins with a relatively short, reserved, listening period 402 for spectrum sensing. No transmission is allowed by any terminal, or user equipment (UE, which is also synonymous with "radio node" as described herein), of the CDMA-IA network during this listening period 402, which is a period of radio silence for the entire network. However, spectrum sensing can and should occur during all other receive time slots for each UE. This is because the received power spectral densities of CDMA-IA signals are expected to be sufficiently low to be easily distinguishable from the signals of the other networks (assumed to be non-CDMA). In other words, the identification of spectral holes in the ambient spectrum should not be materially affected by transmissions within the CDMA-IA network. The intelligence in the terminal will be able to make this determination.

Each frame also has a reserved receive slot 404 for receiving dedicated control information (control information targeting the particular UE). For each UE, the slot 404 occurs at a unique (time-orthogonal) instant in each frame over the superframe, and then repeats in each superframe. Every UE in the network is allocated one such slot 404 in a superframe. The number of frames in a superframe must therefore at least equal the number of UEs in a "connected group," as discussed in further detail below.

This reserved receive slot 404 is designated, "Inbound Dedicated Control Channel." Any number of UEs may use this slot 404 to communicate network control information to the receiving UE, such as Access Request, Access Grant, and or other network control information. These communications are unicast (one-to-one), hence are also referred to as Dedicated Control signals; the logical channel is referred to as Dedicated Control Channel. As the Dedicated Control signals target a specific UE, they use a partial band (band not fully occupied) physical layer, matched to the spectrum occupancy of the destination UE, as per CDMA-IA specifications.

The unreserved time in a frame is divided between the following: 1) Traffic Channels and Dedicated Transmit Control Channels and 2) Broadcast Channels.

Traffic Channels and Dedicated Transmit Control Channels

Traffic Channels may be of Transmit or Receive types. At this time, only unicast traffic is supported. Additionally, the unreserved time is determined by negotiation between UEs in a connected group.

Each UE negotiates bilaterally with other UEs to determine a time duplexing plan, or map (TD_Map) that works for the UE, and every UE that needs to communicate with the UE (a member of the connected group). Note that slot allocations may be made for future frames, beyond the immediate next frame. The life of a TD_Map is finite, although the life could be configurable for a given network, or made dependent on traffic trends, such as load on the network and interference conditions. Once the life of a TD_Map expires, the UE renegotiates a new TD_Map. The negotiation for the next TD_Map may be conducted in the background during an incumbent TD_Map.

Specific negotiation plans are not proposed in this paper. However, it is appreciated that the present plan is the decentralized equivalent of legacy radio access network (RAN) scheduling.

In determining "what TD_Map will work for it," each UE ensures that a minimum fraction of the frame must be enabled for of two types of Broadcast Transmit Channels—Broadcast Control Channel and Broadcast Pilot Signal. The said enablement may opportunistically utilize all epochs in the TrDCCH_TD_map (see FIG. 1) which are not for Receive. The Broadcast Transmit Channels are also referred to as Opportunistic Control Channels (OCCH) because they are scheduled opportunistically, subject to the requirements of the Reserved Control Channel (RCCH) and the Traffic Dedicated Control Channel (TrDCCH).

Broadcast Channels

Two types of Broadcast Channels are supported: (1) Broadcast Control Channel, and (2) Broadcast Pilot Signal.

Broadcast Control Channel

The Broadcast Control Channel carries information such as the Spectrum Usability Mask, which is a binary version of the interference spectrum at the location of the UE; the Connectivity Matrix, which defines the list of UEs that are in connection range from the UE; and the TD_Maps illustrated in FIG. 4.

The Spectrum Usability Mask at the location of a given UE is used by other UEs to spectrally shape Traffic and Dedicated Control signals sent to the given UE. The said spectral shaping cannot be performed for broadcast signals as these signals are not destined for UEs at a particular location. Therefore, for broadcast signals, full-band CDMA-IA signals are used, whereas for unicast traffic and dedicated control channel signals, spectrally shaped, partial-band signals are used.

The Connectivity Matrix shows the connectivity of the UE with other UEs in the network. The TD_Maps (RCCH_TD_Map, OCCH_TD_Map and TrDCCH_TD_Map) show the current organization of negotiated TDD channels at the UE. A new UE that attempts to establish a link with this UE must conform to this map or propose a new organization.

Broadcast Pilot Signal

The Broadcast Pilot signal communicates time and frequency references used to demodulate signals received from the transmitting UE. The Pilot signal is unique to the UE and identifies the UE. In addition to communicating the time/frequency references, the pilot signal may carry low data rate, essential control information, similar to the 50 bits-per-second (bps) ephemeris/almanac data in GPS. One example of such data is the CDMA-IA Code Set ID. The association between the Code Set and the UE could be Absolute or Ad Hoc, as described below.

In an Absolute association example, the mapping of the Code Set (e.g. a set of pseudo-noise (PN) or other codes) to UEs may be absolute, i.e., linked to the UE's electronic serial number, which is used to create a long PN code that is unique to the UE. All UEs have knowledge of this sequence at any given instant in time based on a specified "long code mask" that is related to a particular UE. This method can generate PN codes to accommodate any number of UEs.

In an Ad hoc association example, the size of the code library is limited. A UE self-selects a particular Code Set ID, based on the number of Code Sets already in use within a given listening range. The UEs would self-select the Code Set and use a temporary electronic ID, linked to the Code Set, to identify itself to other UEs; this ID could change in the next session. There is no permanent association between the physical UE, as identified by its electronic serial number, and the Code Set.

Network Connectivity

Figures 5, 6:
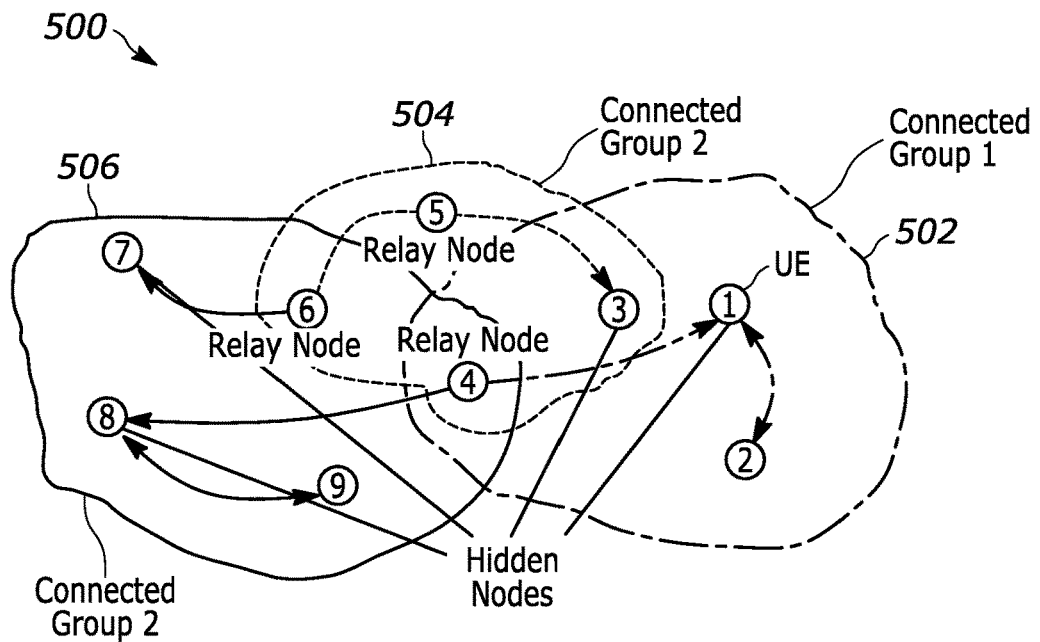
FIG. 5 is a diagram illustrating an example of a network among a plurality of nodes, in accordance with some aspects of the disclosure.
FIG. 6 is a table illustrating an example of a Connectivity Matrix, in accordance with some aspects of the disclosure.

FIG. 5 is a diagram illustrating an example of a network 500 among a plurality of nodes, in accordance with some aspects of the disclosure. The network 500 is envisioned as a mesh network where connectivity exists between groups of UEs, referred to as connected groups, which are subsets of the global set of all UEs.

As illustrated in FIG. 5, the network includes three connected groups 502, 504, and 506. The connected group 502 includes UEs 1, 2, 3, and 4. The connected group 504 includes UEs 3, 4, 5, and 6. The connected group 506 includes UEs 4, 6, 7, 8, and 9.

Using relay nodes, links may be established between UEs that are not connected directly. In the example of FIG. 5, the UEs 4, 5, and 6 are relay nodes. Additionally, in the example of FIG. 5, the UEs 1, 3, 7, and 8 are hidden nodes.

Each of the relay links are independent at the physical layer (involve demodulation and remodulation at the relay). This independence at the physical layer obviates the need to share the Spectrum Usability Mask and G-matrices between hidden nodes.

UEs determine the opportunities for relay transport from the Connectivity Matrices broadcast by each UE via the Broadcast Control Channel. FIG. 6 is a table illustrating an example of a Connectivity Matrix 600, in accordance with some aspects of the disclosure.

The Connectivity Matrix 600 is laid out in a grid, with transmit UE indexes as row headers, and receive UE indexes as column headers. The table entries $Q_{Tx,Rx}$ indicate the signal quality of the transmitting (Tx) UE's broadcast control signal measured at the receiving (Rx) UE, for example, ranging from 0 being unusable, 1: poor, 2: fair, to 3 being good. At 2-bits per entry, the total field size is 2K(K−1) data bits, where K is the number of active UEs. As the link may not be reciprocal due to different environmental conditions (e.g. interference and multipath) at the two receivers, the Connectivity Matrix 600 may not be diagonally symmetric. A suitable metric for $Q_{Tx,Rx}$ may be the signal to noise and interference ratio (SNIR) at the receiver. The channel quality indicator $Q_{Tx,Rx}$ may be used to determine the modulation and coding scheme of the transmitted signal, and whether the link between the two UEs is deemed acceptable, e.g. 2: fair or 3: good. The signal quality must be acceptable in both directions for the link to be considered bidirectionally closed, which is usually required for unicast, handshake protocols.

Note that, in order to implement transport relay, each UE will need to rebroadcast Connectivity Matrices received from other UEs (not just transmit the UE's own connectivity information). The deeper the level of connectivity that is rebroadcast, the greater the number of relay hops that can be supported by the network 500. It should be noted also that, in a congested network, the link signal quality may not depend only on the distance between two nodes, but also on the spectral occupancy, local noise, and multipath conditions at the receiver. Therefore, a longer relay-path, using relay nodes with less congestion, may in fact offer greater link quality than a shorter one. Because of the ability of the CDMA-IA network to monitor the $Q_{Tx,Rx}$ on each link, the distributed intelligence in the system enables optimal routing of relay paths using a plurality of network performance criteria.

Network Set Up and Tear Down

Figure 7:
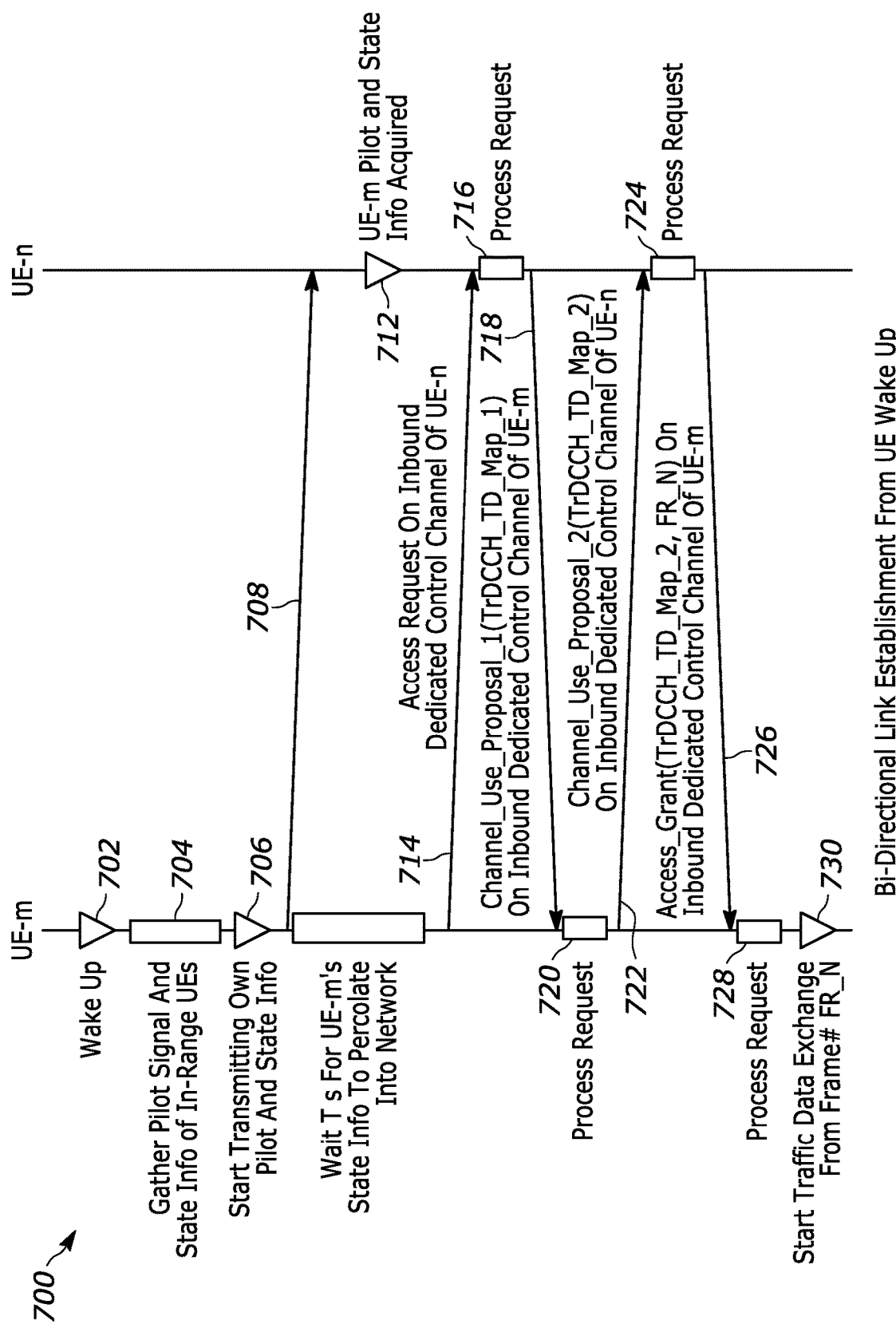
FIG. 7 is a transaction ladder diagram illustrating an example of establishing a communication link between a UE-m and a UE-n, in accordance with various aspects of the present disclosure.

FIG. 7 is a transaction ladder diagram illustrating an example 700 of establishing a communication link between a UE-m and a UE-n, in accordance with various aspects of the present disclosure. At transaction 702, the UE-m wakes up. At transaction 704, upon waking up, the UE-m gathers pilot signals and status information about UEs that are in connectivity range. During the transaction 704, the UE-m gather the pilot signal and the status information of UE-n.

At transactions 706 and 708, the UE-m also starts broadcasting the UE-m's own pilot signal and state information (the Spectrum Usability Mask, the Connectivity Matrix, the TD_Maps as described above).

At transaction 710, the UE-m waits an amount of time for its state information to percolate the network. At transaction 712, the UE-n receives the pilot and state information from the UE-m transmitted at the transaction 710. At transaction 714, the UE-m desires to exchange data with the UE-n, which is in listening range, and the UE-m sends an Access_Request message on the Dedicated Inbound Control Channel of UE-n.

The Dedicated Inbound Control channel uses a partial-band PN or Gold code signal, spectrally matched to the interference spectrum at UE-n. The Access_Request is sent on an Inbound Control Protocol Data Unit (PDU) that is common throughout the network—it may be thought of as a RACH PDU shared by all UEs. The PDU uses an unique PN or Gold code for each destination UE. The UE-n listens to this channel at every RCCH time slot. This is a spread spectrum signal, and multiple RACH signals may be distinguished if the times of arrival are greater than a chip duration.

The Access_Request signal is modulated with the ID of the transmitting UE (in this case the ID of UE-m). This enables the receiving UE-n to identify the UE-m as the source of the access request. Time/frequency correction feedback is provided as necessary, and as is customary in processing a RACH signal.

At transaction 716, the UE-n processes the access request from the UE-m. At transaction 718, the UE-n proposes a TrDCCH_TD_Map_1 on an Inbound Dedicated Control Channel of UE-m. The UE-n is aware of the Inbound DCCH of UE-m from the state information received from the UE-m.

At transaction 720, the UE-m processes the TrDCCH_TD_Map_1 from the UE-n. The UE-m may exchange traffic data with UE-n, starting with the next, immediate frame, using the existing TrDCCH_TD_Map of UE-n. If UE-m finds the existing TD-Map of UE-n to be unacceptable, at transaction 722, the UE-m may propose a different TrDCCH_TD_Map_2 using the Inbound DCCH of the UE-n and this proposal may take effect at a future frame to be specified by UE-n.

At transaction 724, the UE-n processes the TrDCCH_TD_Map_2 from the UE-m. At transaction 726, the UE-n may respond to the UE-m's proposed TD_Map on its present Outbound DCCH or the Inbound DCCH of UE-m as illustrated in FIG. 7. The response may be an acceptance (i.e., an Access_Grant) of UE-m's proposed TD_Map together with the ID of the future frame when it will take effect (FR_N). Alternatively, the UE-n may make a counterproposal with a frame ID. This negotiation process may continue for a finite number of cycles with an exit path.

At transaction 728, the UE-m processes the acceptance from the UE-n. At transaction 730, the UE-m starts traffic data exchange with the UE-n based on the future frame (i.e., FR_N).

In view of the foregoing, the UE-m joins a network (e.g., the network 500) by beginning to search for all pilot signals in the network (e.g., GPS). The UE-m starts transmitting pilot signals in time-discontinuous bursts (in GPS they are transmitted continuously). In some examples, the band may be partially jammed, requiring an interference whitening filter (GPS does not use interference whitening).

Once enough samples of the pilot signal have been collected, UE-m is able to achieve frequency and time sync to every UE in listening range (e.g., the UE-n), i.e., in its connected group. Thereby, the UE-m becomes aware of which UEs are within its listening range. The UE-m is also able to determine the CDMA-IA Code Set of each UE in listening range. This information is either embedded as modulated data on the pilot signals transmitted by the UEs, or by established by association, based on the code used in the pilot signal. The UE-m is also able to receive the Spectrum Usability Map and Connectivity Matrix of each UE.

Additionally, in some examples, a double hop link may set up. However, the link is not limited to a double hop, and the number of hops may be increased using the same approach, noting that a greater number of hops requires deeper connectivity information to be shared between the UEs.

Setting Up a Multi-Hop Link

A double hop link is set up by a transmitting UE (i.e., the UE-m) based on the Connectivity Matrix (e.g., the Connectivity Matrix 600). For example, the Connectivity Matrix may show that a UE-m/UE-n/UE-k link may be closed based on the channel quality indicator Q of the two sub-links (m-n) and (n-k) but an end-end (m-k) link cannot be closed.

The UE-m will indicate to UE-n the specifics of the second link (e.g. the ID of UE-k, throughput and QoS objectives) during the resource negotiation phase. The end-end link will be set up if the negotiation is successful. The two links are also independent at the physical layer, i.e., the G-matrix operative on the second link is determined by UE-n and not UE-m.

The number of hops may be increased beyond two by following the same approach as above, noting that a greater the number of hops will require deeper connectivity information to be shared between the UEs.

Figure 8:
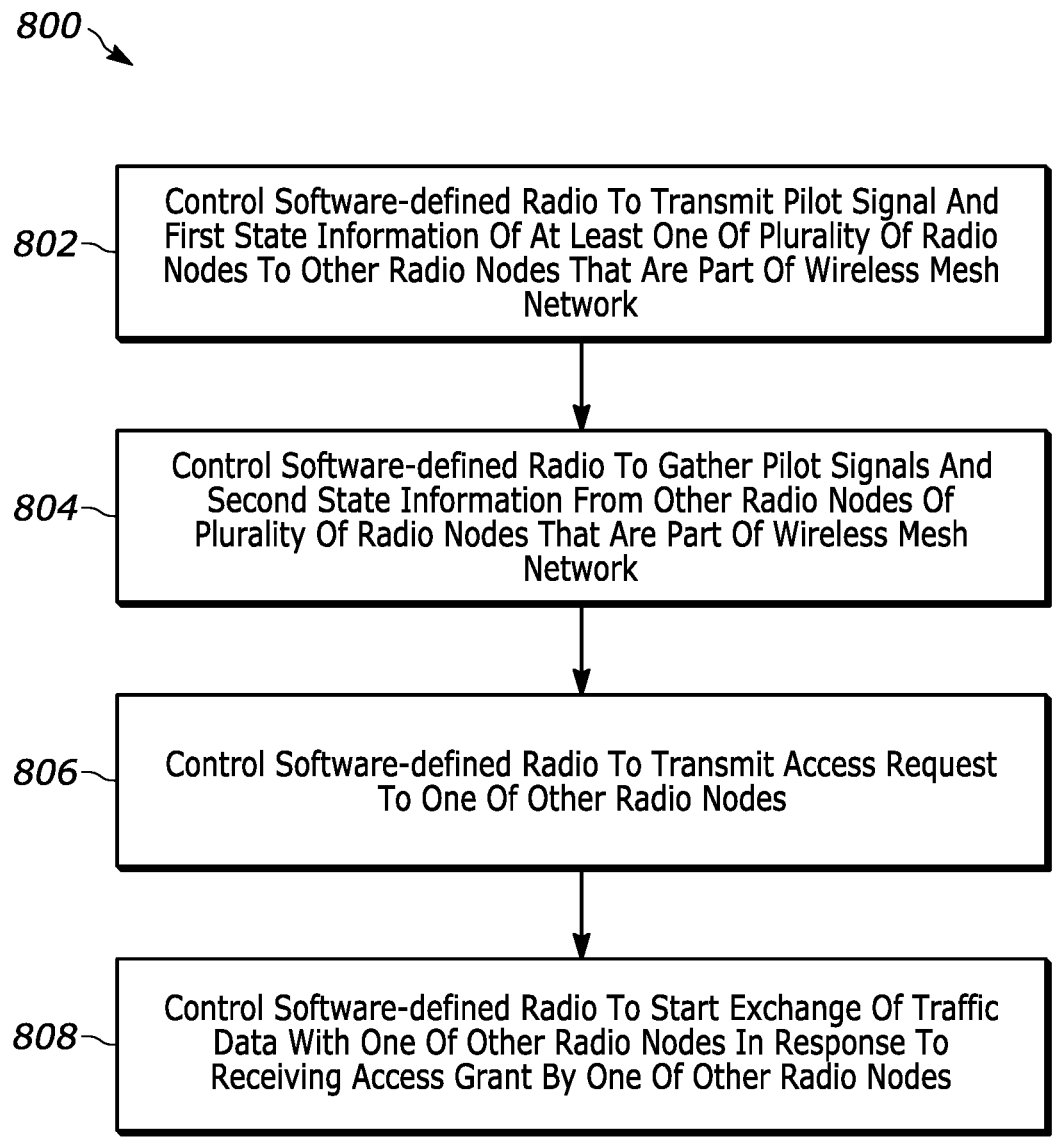
FIG. 8 is a flowchart illustrating a wireless communication method, in accordance with some aspects of the disclosure.

FIG. 8 is a flowchart illustrating a wireless communication method 800, in accordance with some aspects of the disclosure. As illustrated in FIG. 8, the method 800 includes controlling, with an electronic processor, a software-defined radio to transmit a pilot signal and first state information of at least one radio node of a plurality of radio nodes to other radio nodes of the plurality of radio nodes that are part of a wireless mesh network (at block 802). The method 800 includes controlling, with the electronic processor, the software-defined radio to gather pilot signals and second state information from the other radio nodes of the plurality of radio nodes that are part of the wireless mesh network (at block 804). The method 800 includes controlling, with the electronic processor, the software-defined radio to transmit an access request to one of the other radio nodes (at block 806). The method 800 also includes controlling, with the electronic processor, the software-defined radio to start exchange of traffic data with the one of the other radio nodes in response to receiving an access grant by the one of the other radio nodes (at block 808).

The following are a set of non-limiting enumerated examples of the wireless communication systems, wireless communication networks, wireless communication methods, and non-transitory computer-readable media of the present disclosure.

Example 1: a wireless communication system comprising: a plurality of radio nodes forming a wireless mesh network, wherein pairs of the plurality of radio nodes are configured to communicate with each other, at least one radio node of the plurality of radio nodes including a software-defined radio, a memory, and an electronic processor communicatively connected to the memory, and the electronic processor configured to control the software-defined radio to transmit a pilot signal and first state information of the at least one radio node to other radio nodes of the plurality of radio nodes that are part of the wireless mesh network, control the software-defined radio to gather pilot signals and second state information from the other radio nodes that are part of the wireless mesh network, control the software-defined radio to transmit an access request to one of the other radio nodes, and control the software-defined radio to start exchange of traffic data with the one of the other radio nodes in response to receiving an access grant by the one of the other radio nodes.

Example 2: the wireless communication system of Example 1, wherein, to control the software-defined radio to transmit the access request to one of the other radio nodes, the electronic processor is further configured to determine an Inbound Dedicated Control Channel (DCCH) associated with the one of the other radio nodes from the first state information, and control the software-defined radio to transmit the access request to one of the other radio nodes on the Inbound DCCH associated with the one of the other radio nodes from the first state information.

Example 3: the wireless communication system of Examples 1 or 2, wherein the electronic processor is further configured to receive a proposed TD_Map from the one of the other radio nodes in response to transmitting the access request, determine whether the proposed TD_Map is acceptable, responsive to determining that the proposed TD_Map is not acceptable, generate a second proposed TD_Map that is acceptable, and control the software-defined radio to transmit the second proposed TD_Map to the one of the other radio nodes, and wherein the access grant is an acceptance of the second proposed TD_Map.

Example 4: the wireless communication system of Example 3, wherein the electronic processor is further configured to determine an Inbound Dedicated Control Channel (DCCH) associated with the one of the other radio nodes from the first state information, control the software-defined radio to receive the proposed TD_Map on the Inbound DCCH associated with the one of the other radio nodes, control the software-defined radio to transmit the second proposed TD_Map on the Inbound DCCH associated with the one of the other radio nodes, and control the software-defined radio to receive the access grant on the Inbound DCCH associated with the one of the other radio nodes.

Example 5: the wireless communication system of any of Examples 1-4, wherein the second state information includes connectivity matrices of the other radio nodes.

Example 6: the wireless communication system of any of Examples 1-5, wherein the second state information includes TD_Maps of the other radio nodes.

Example 7: the wireless communication system of any of Examples 1-6, wherein the second state information includes Spectrum Usability Masks of the other radio nodes.

Example 8: the wireless communication system of any of Examples 1-7, wherein the first state information includes a connectivity matrix of the at least one radio node.

Example 9: the wireless communication system of any of Examples 1-8, wherein the first state information includes a TD_Map of the at least one radio node.

Example 10: the wireless communication system of any of Examples 1-9, wherein the first state information includes a Spectrum Usability Mask of the at least one radio node.

Example 11: the wireless communication system of any of Examples 1-10, wherein the pairs of the plurality of radio nodes are configured to communicate with each other further includes the pairs of the plurality of radio nodes communicate indirectly with one another, using one or more additional radio nodes of the plurality of radio nodes as relays, and wherein a relay route is determined adaptively to maximize end-to-end network performance criteria, informed by a signal quality metric between the pairs of the plurality of radio nodes.

Example 12: a wireless communication network comprising: a plurality of radio nodes using time division duplexing having a first time period during which a first radio node is transmitting and a second radio node is receiving, and a second time period during which the second radio node is transmitting and the first radio node is receiving, wherein a ratio of the first and second periods is time variable.

Example 13: the wireless communication network of Example 12, wherein an adjustment of the ratio of the first time period and the second time period is made responsive to traffic and interference conditions at the plurality of radio nodes.

Example 14: the wireless communication network of Examples 12 or 13, wherein the plurality of radio nodes includes pairs of first and second radio nodes that communicate simultaneously with each other using respective ratios of respective first time periods and respective second time periods having more than one value.

Example 15: the wireless communication network of any of Examples 12-14, wherein the plurality of radio nodes includes pairs of first and second radio nodes that communicate simultaneously with each other, each pair of the pairs using a time duplexing map that is optimized for the each pair.

Example 16: a wireless communication method, the method comprising: controlling, with an electronic processor, a software-defined radio to transmit a pilot signal and first state information of at least one radio node of a plurality of radio nodes to other radio nodes of the plurality of radio nodes that are part of a wireless mesh network; controlling, with the electronic processor, the software-defined radio to gather pilot signals and second state information from the other radio nodes of the plurality of radio nodes that are part of the wireless mesh network; controlling, with the electronic processor, the software-defined radio to transmit an access request to one of the other radio nodes; and controlling, with the electronic processor, the software-defined radio to start exchange of traffic data with the one of the other radio nodes in response to receiving an access grant by the one of the other radio nodes.

Example 17: the wireless communication method of Example 16, wherein controlling the software-defined radio to transmit the access request to one of the other radio nodes further includes determining an Inbound Dedicated Control Channel (DCCH) associated with the one of the other radio nodes from the first state information; and controlling the software-defined radio to transmit the access request to one of the other radio nodes on the Inbound DCCH associated with the one of the other radio nodes from the first state information.

Example 18: the wireless communication method of Examples 16 or 17, the method further comprising: receiving a proposed TD_Map from the one of the other radio nodes in response to transmitting the access request; determining whether the proposed TD_Map is acceptable; responsive to determining that the proposed TD_Map is not acceptable, generating a second proposed TD_Map that is acceptable; and control the software-defined radio to transmit the second proposed TD_Map to the one of the other radio nodes, and wherein the access grant is an acceptance of the second proposed TD_Map.

Example 19: the wireless communication method of Example 18, the method further comprising: determining an Inbound Dedicated Control Channel (DCCH) associated with the one of the other radio nodes from the first state information; controlling the software-defined radio to receive the proposed TD_Map on the Inbound DCCH associated with the one of the other radio nodes; controlling the software-defined radio to transmit the second proposed TD_Map on the Inbound DCCH associated with the one of the other radio nodes; and controlling the software-defined radio to receive the access grant on the Inbound DCCH associated with the one of the other radio nodes.

Example 20: the wireless communication method of any of Examples 16-19, wherein the second state information includes connectivity matrices of the other radio nodes.

Example 21: the wireless communication method of any of Examples 16-20, wherein the second state information includes TD_Maps of the other radio nodes.

Example 22: the wireless communication method of any of Examples 16-21, wherein the second state information includes Spectrum Usability Masks of the other radio nodes.

Example 23: a non-transitory computer-readable medium comprising instructions that, when executed by a server, cause the server to perform a set of operations, the set of operations comprising: controlling a software-defined radio to transmit a pilot signal and first state information of at least one radio node of a plurality of radio nodes to other radio nodes of the plurality of radio nodes that are part of a wireless mesh network; controlling the software-defined radio to gather pilot signals and second state information from the other radio nodes of the plurality of radio nodes that are part of the wireless mesh network; controlling the software-defined radio to transmit an access request to one of the other radio nodes; and controlling the software-defined radio to start exchange of traffic data with the one of the other radio nodes in response to receiving an access grant by the one of the other radio nodes.

Thus, the present disclosure provides, among other things, wireless communication systems, networks, methods, and non-transitory computer-readable media with CDMA-IA network concept of operations and media access control (MAC) layer. Various features and advantages of the present disclosure are set forth in the following claims.

What is claimed is:

1. A wireless communication system comprising:
a plurality of radio nodes forming a wireless mesh network, wherein pairs of the plurality of radio nodes are configured to communicate with each other, at least one radio node of the plurality of radio nodes including
a software-defined radio,
a memory, and
an electronic processor communicatively connected to the memory, and the electronic processor configured to
control the software-defined radio to transmit a pilot signal and first state information of the at least one radio node to other radio nodes of the plurality of radio nodes that are part of the wireless mesh network,
control the software-defined radio to gather pilot signals and second state information from the other radio nodes that are part of the wireless mesh network,
control the software-defined radio to transmit an access request to one of the other radio nodes, and
control the software-defined radio to start exchange of traffic data with the one of the other radio nodes in response to receiving an access grant by the one of the other radio nodes.

2. The wireless communication system of claim 1, wherein, to control the software-defined radio to transmit the access request to one of the other radio nodes, the electronic processor is further configured to
determine an Inbound Dedicated Control Channel (DCCH) associated with the one of the other radio nodes from the first state information, and
control the software-defined radio to transmit the access request to one of the other radio nodes on the Inbound DCCH associated with the one of the other radio nodes from the first state information.

3. The wireless communication system of claim 1, wherein the electronic processor is further configured to
receive a proposed Transmit/Receive Duplexing Time Map (TD_Map) from the one of the other radio nodes in response to transmitting the access request,
determine whether the proposed TD_Map is acceptable,
responsive to determining that the proposed TD_Map is not acceptable, generate a second proposed TD_Map that is acceptable, and
control the software-defined radio to transmit the second proposed TD_Map to the one of the other radio nodes, and
wherein the access grant is an acceptance of the second proposed TD_Map.

4. The wireless communication system of claim 3, wherein the electronic processor is further configured to
determine an Inbound Dedicated Control Channel (DCCH) associated with the one of the other radio nodes from the first state information,
control the software-defined radio to receive the proposed TD_Map on the Inbound DCCH associated with the one of the other radio nodes,
control the software-defined radio to transmit the second proposed TD_Map on the Inbound DCCH associated with the one of the other radio nodes, and
control the software-defined radio to receive the access grant on the Inbound DCCH associated with the one of the other radio nodes.

5. The wireless communication system of claim 1, wherein the second state information includes connectivity matrices of the other radio nodes.

6. The wireless communication system of claim 1, wherein the second state information includes Transmit/Receive Duplexing Time Map (TD_Map) of the other radio nodes.

7. The wireless communication system of claim 1, wherein the second state information includes Spectrum Usability Masks of the other radio nodes.

8. The wireless communication system of claim 1, wherein the first state information includes a connectivity matrix of the at least one radio node.

9. The wireless communication system of claim 1, wherein the first state information includes a Transmit/Receive Duplexing Time Map (TD_Map) of the at least one radio node.

10. The wireless communication system of claim 1, wherein the first state information includes a Spectrum Usability Mask of the at least one radio node.

11. The wireless communication system of claim 1, wherein the pairs of the plurality of radio nodes are configured to communicate with each other further includes the pairs of the plurality of radio nodes communicate indirectly with one another, using one or more additional radio nodes of the plurality of radio nodes as relays, and wherein a relay route is determined adaptively to maximize end-to-end network performance criteria, informed by a signal quality metric between the pairs of the plurality of radio nodes.

12. A wireless communication method, the method comprising:
- controlling, with an electronic processor, a software-defined radio to transmit a pilot signal and first state information of at least one radio node of a plurality of radio nodes to other radio nodes of the plurality of radio nodes that are part of a wireless mesh network;
- controlling, with the electronic processor, the software-defined radio to gather pilot signals and second state information from the other radio nodes of the plurality of radio nodes that are part of the wireless mesh network;
- controlling, with the electronic processor, the software-defined radio to transmit an access request to one of the other radio nodes; and
- controlling, with the electronic processor, the software-defined radio to start exchange of traffic data with the one of the other radio nodes in response to receiving an access grant by the one of the other radio nodes.

13. The wireless communication method of claim 12, wherein controlling the software-defined radio to transmit the access request to one of the other radio nodes further includes
- determining an Inbound Dedicated Control Channel (DCCH) associated with the one of the other radio nodes from the first state information; and
- controlling the software-defined radio to transmit the access request to one of the other radio nodes on the Inbound DCCH associated with the one of the other radio nodes from the first state information.

14. The wireless communication method of claim 12, the method further comprising:
- receiving a proposed Transmit/Receive Duplexing Time Map (TD_Map) from the one of the other radio nodes in response to transmitting the access request;
- determining whether the proposed TD_Map is acceptable;
- responsive to determining that the proposed TD_Map is not acceptable, generating a second proposed TD_Map that is acceptable; and
- control the software-defined radio to transmit the second proposed TD_Map to the one of the other radio nodes; and
- wherein the access grant is an acceptance of the second proposed TD_Map.

15. The wireless communication method of claim 14, the method further comprising:
- determining an Inbound Dedicated Control Channel (DCCH) associated with the one of the other radio nodes from the first state information;
- controlling the software-defined radio to receive the proposed TD_Map on the Inbound DCCH associated with the one of the other radio nodes;
- controlling the software-defined radio to transmit the second proposed TD_Map on the Inbound DCCH associated with the one of the other radio nodes; and
- controlling the software-defined radio to receive the access grant on the Inbound DCCH associated with the one of the other radio nodes.

16. The wireless communication method of claim 12, wherein the second state information includes connectivity matrices of the other radio nodes.

17. The wireless communication method of claim 12, wherein the second state information includes Transmit/Receive Duplexing Time Map (TD_Map) of the other radio nodes.

18. The wireless communication method of claim 12, wherein the second state information includes Spectrum Usability Masks of the other radio nodes.

19. A non-transitory computer-readable medium comprising instructions that, when executed by a server, cause the server to perform a set of operations, the set of operations comprising:
- controlling a software-defined radio to transmit a pilot signal and first state information of at least one radio node of a plurality of radio nodes to other radio nodes of the plurality of radio nodes that are part of a wireless mesh network;
- controlling the software-defined radio to gather pilot signals and second state information from the other radio nodes of the plurality of radio nodes that are part of the wireless mesh network;
- controlling the software-defined radio to transmit an access request to one of the other radio nodes; and
- controlling the software-defined radio to start exchange of traffic data with the one of the other radio nodes in response to receiving an access grant by the one of the other radio nodes.

* * * * *